United States Patent
Lee et al.

[11] 3,821,198
[45] June 28, 1974

[54] DERIVATIVES OF 6-AMINO PENICILLANIC ACID

[75] Inventors: Bong Kuk Lee, Old Bridge; Dewey D. Y. Ryu, East Brunswick; Felix Edward Pansy, Jamesburg, all of N.J.

[73] Assignee: E. R. Squibb & Sons, Inc., Princeton, N.J.

[22] Filed: May 3, 1972

[21] Appl. No.: 249,840

[52] U.S. Cl......... 260/239.1, 260/306.7, 260/243 C, 424/246, 424/271
[51] Int. Cl............................................. C07d 99/16
[58] Field of Search................................. 260/239.1

[56] References Cited
UNITED STATES PATENTS
3,157,639  11/1964  Doyle et al. ................. 260/239.1

Primary Examiner—Nicholas S. Rizzo
Attorney, Agent, or Firm—Lawrence S. Levinson; Merle J. Smith; Donald J. Barrack

[57] ABSTRACT

New penicillin and cephalosporin derivatives and methods for preparing the same are provided, said derivatives having the structures

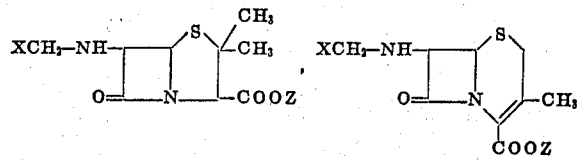

and

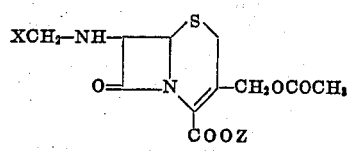

wherein Z is hydrogen, lower alkyl on a salt forming ion and X is aryl, substituted aryl, lower alkyl, cyclohexadienyl, cyclo-alkyl or saturated or unsaturated N-, O- or S-containing heterocyclic rings. These compounds are useful as antibacterial agents.

3 Claims, No Drawings

DERIVATIVES OF 6-AMINO PENICILLANIC ACID

This invention relates to new penicillin and cephalosporin derivatives of the formula

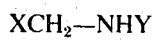

wherein X is aryl, substituted aryl, lower alkyl, cyclohexadienyl, cycloalkyl or a saturated or unsaturated N-, O- or S-heterocyclic ring containing 5 to 7 members and one, two or three hetero atoms; Y is

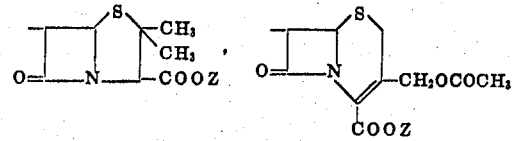

or

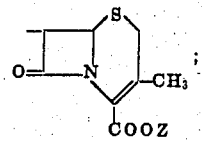

and Z is hydrogen, lower alkyl or a salt forming ion, e.g., an alkali metal as sodium or potassium, an alkaline earth metal like calcium or magnesium, or that of any organic base like dibenzylamine, N,N-dibenzylethylenediamine or the like.

Thus, the penicillin and cephalosporin derivatives of the invention include the following sub-genuses:

II 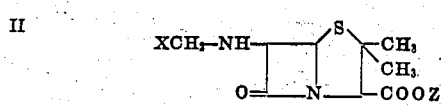

III 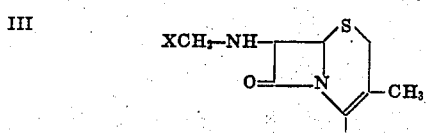

IV 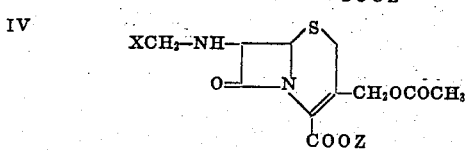

The lower alkyl groups represented by the above X groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substitutents any of the aryl groups mentioned below as well as halogen (Cl, Br, I or F), cyano and/or ureido, such as a cyanoalkyl group or a ureido-substituted benzyl group

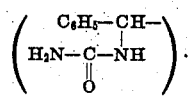

The term "aryl" includes monocyclic or bicyclic monovalent aromatic ring systems such as phenyl or naphthyl. These aryl radicals can include as substituents at the ortho-position halogen, hydroxy, alkanoic acid, lower alkoxy, amido or any of the alkyl groups mentioned hereinbefore.

For example, aryl radicals and substituted aryl radicals contemplated herein include, but are not limited to, the following:

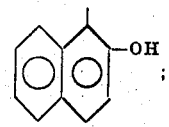

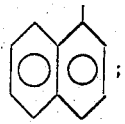

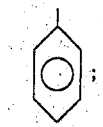

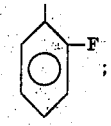

and

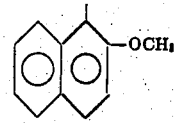

The N-, O- or S-containing heterocyclic groups represented by X may contain 5 to 7 members in the ring including one or two hetero atoms. Examples of such heterocyclic groups include, but are not limited to, the following:

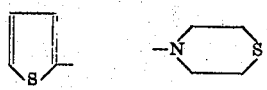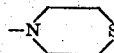

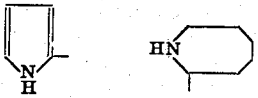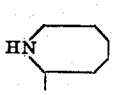

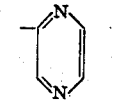

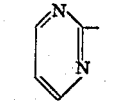

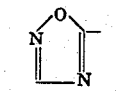

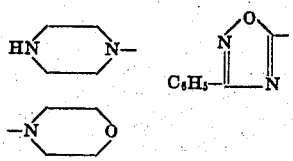

The term "cycloalkyl" includes monocyclic carbocyclic radicals having from three to about six carbons such as cyclopropyl, cyclobutyl, cyclopentyl and cyclohexyl.

The compounds of Formulae II, III and IV can be prepared by reacting compounds of the structure IVa   X—CH=N—Y which includes

V

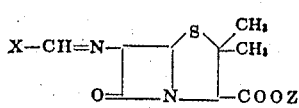

VI

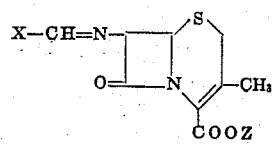

and

VII

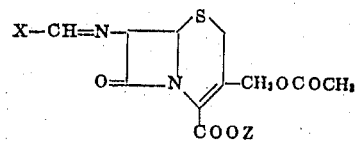

respectively, with a reducing agent such as sodium borohydride, aluminum borohydride, lithium aluminum hydride, or hydrogen in conjunction with a catlyst for reduction such as platinum or palladium.

The above reduction can be carried out in water or aqueous solvents, such as aqueous potassium phosphate, at temperatures ranging from about 0° to about 30°C and preferably from about 10° to about 20°C employing a molar ratio of Compound V, VI or VII to reducing agent within the range from about 1:1.5 to about 1:10 preferably from about 1:2 to about 1:5.

The formula V, VI and VII starting materials are prepared by reacting compounds of the structures

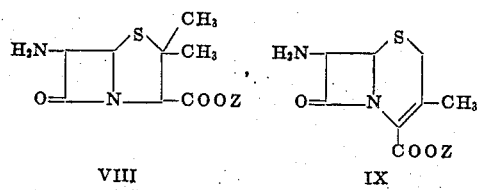

and

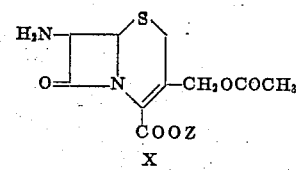

respectively, with an aldehyde of the structure

XI    

In carrying out the above reaction, the reaction of compounds VIII, IX or X with the aldehyde XI is preferably carried out in an aqueous media such as in a mixture of water with a lower alkanol such as methanol, ethanol or n-propanol, or ketones such as methylethyl ketone or methyl isobutyl ketone. The reaction may be carried at temperatures ranging from about 0° to about 30°C. Compounds VIII, IX or X are employed in a molar ratio to Compound XI within the range of from about 1:1 to about 1:3, preferably from about 1:1 to about 1:1.2 and optimally at about 1:1.1.

Examples of aldehydes which can be employed herein as starting materials include, but are not limited to, the following

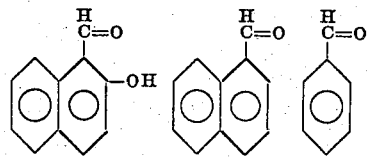

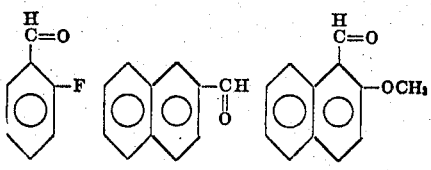

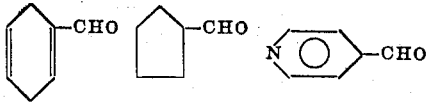

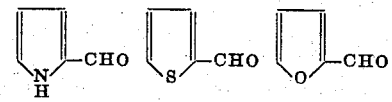

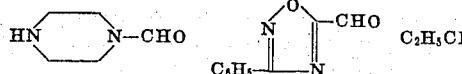

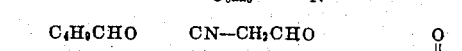

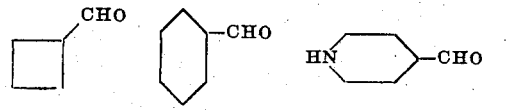

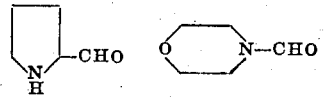

The products of this invention form salts which are also part of the invention. Basic salts form with the acid moiety as discussed above in connection with the symbol Z. Acid-addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a propylactic manner, e.g., in cleaning or disinfecting compositions, or otherwise to combat infections due to organisms such as those named above, and in general may be utilized in a manner similar to penicillin G and other penicillins and cephalosporins. For example, a compound of Formula I or a physiologically acceptable salt thereof may be used in various animal species in an amount of about 0.1 to 100 mg./kg. daily, orally or parenterally, in single or two to four divided doses to treat infections of bacterial origin. Up to about 600 mg. of a compound of Formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1 percent by weight of such compounds admixed with, suspended or dissolved in conventional inert dry or aqueous carriers for application by washing or spraying may be used.

The following examples are illustrative of the invention. All temperatures are on the centigrade scale.

EXAMPLE 1

Na salt of 6-[[(2-Hydroxy-1-naphthyl)methyl]amino]-3,3-dimethyl-7-oxo-4-thia-1-azabicyclo[3.2.0]-heptane-2-carboxylic acid Na salt of 6-[[(2-Hydroxy-1-naphthyl)methylene]amino]-3,3-dimethyl-7-oxo-4-thia-1-azabicyclo[3.2.0]-heptane-2-carboxylic acid.

The sodium salt of 6-aminopenicillanic acid is formed by dissolving 1,310 mg (6millimoles) of 6-aminopenicillanic acid (6-APA) and 504 mg (6 millimoles) of NaHCO₃ in a mixture of 40 ml H₂O and 16 ml methanol. 1,238 mg (7.2 millimoles) of 2-hydroxy-1-naphthaldehyde is added to the sodium salt solution. The reaction mixture is stirred for 18 hours in a cold room and methanol is removed in vacuo at <10°C. The remaining aqueous portion is lyophilized and excess aldehyde is removed by washing the resultant solid with ether. 2,650 mg (95%) of 6-[[(2-hydroxy-1-naphthyl)methylene]amino]-3,3-dimethyl-7-oxo-4-thia-1-azabicyclo[3.2.0]-heptane-2-carboxylic acid in the form of a yellowish solid is obtained.

Sodium salt of 6-[[(2-Hydroxy-1-naphthyl)methyl]amino]-3,3-dimethyl-7-oxo-4-thia-1-azabicyclo[3.2.0]-heptane-2-carboxylic acid 2,584 mg (4.85 millimoles) of 6-[[(2-hydroxy-1-naphthyl)methylene]amino]-3,3-dimethyl-7-oxo-4-thia-1-azabicyclo[3.2.0]-heptane-2-carboxylic acid is dissolved in 120 ml potassium phosphate buffer (0.05 M, pH6). 252 mg (6.65 millimoles) of $NaBH_4$ is dissolved in 5.5 ml $H_2O$ and added, dropwise, for one half hour, with vigorous stirring, on an ice-bath. The reaction mixture is acidified to a pH of 2 with 1 N HCl. After washing the resultant solid with water and cyclohexane, 1,568 mg of product (white solid) is isolated. 1,440 mg (3.88 millimoles) of the product (free acid) and 352 mg (4.2 millimoles) of $NaHCO_3$ are dissolved in a mixture of 25 ml $H_2O$ and 125 ml methanol. Methanol is removed in vacuo at <10°C. The remaining aqueous portion is lyophilized, and 1,350 mg of 6-[[(2-hydroxy-1-naphthyl)methyl]amino]-3,3-dimethyl-7-oxo-4-thia-1-azabicyclo[3.2.0]-heptane-2-carboxylic acid in the form of a light greenish-brown solid is isolated and analyzes as follows:

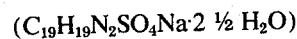

| Element | Calculated | Found |
|---|---|---|
| C | 51.99 | 51.50 |
| H | 5.48 | 5.07 |
| N | 6.39 | 6.24 |
| S | 7.30 | 7.90 |
| Na | 5.24 | 5.09 |

EXAMPLES 2 to 21

In a manner similar to that described in Example 1, the aldehyde shown in column A of Table I below is reacted with the 6–APA, 7–ACA (formula X) or 7–ADCA (formula IX) derivative shown in column B to form the intermediate shown in column C, which is reacted with a reducing agent such as any of those mentioned hereinbefore, to form the product shown in column D.

Table I
| Example No. | Column A XCHO X | Column B H$_2$N-Y | Column C XCH=NHY X | Y | Column D XCH$_2$NHY X | Y |
|---|---|---|---|---|---|---|
| 2. |  |  |  |  |  |  |
| 3. |  |  |  |  |  |  |
| 4. |  |  |  |  |  |  |

TABLE I—Continued

| Example No. | Column A XCHO X | Column B H$_2$N-Y | Column C XCH=NHY X | Y | Column D XCH$_2$NHY X | Y |
|---|---|---|---|---|---|---|
| 5. | phenyl | 3-amino-4-methyl-7-oxo thiazine COONa | phenyl | 4-methyl-7-oxo thiazine COONa | phenyl | 4-methyl-7-oxo thiazine COONa |
| 6. | 2-fluorophenyl | 3-amino-4-methyl-7-oxo thiazine COOH | 2-fluorophenyl | 4-methyl-7-oxo thiazine COOH | 2-fluorophenyl | 4-methyl-7-oxo thiazine COOH |
| 7. | 6-methyl-2-naphthyl | 3-amino-4-methyl-7-oxo thiazine COOK | 6-methyl-2-naphthyl | 4-methyl thiazine COOK | 6-methyl-2-naphthyl | 4-methyl thiazine COOK |
| 8. | 1-methyl-2-methoxynaphthyl | 3-amino-4-(CH$_2$OCOCH$_3$)-7-oxo thiazine COONa | 1-methyl-2-methoxynaphthyl | 4-(CH$_2$OCOCH$_3$) thiazine COONa | 1-methyl-2-methoxynaphthyl | 4-(CH$_2$OCOCH$_3$)-7-oxo thiazine COONa |

TABLE I – Continued
| Example No. | Column A<br>XCHO<br>X | Column B<br>$H_2N-Y$<br>Y | Column C<br>XCH=NHY<br>X | Y | Column D<br>XCH$_2$NHY<br>X | Y |
|---|---|---|---|---|---|---|
| 9. | $C_3H_7-$ | 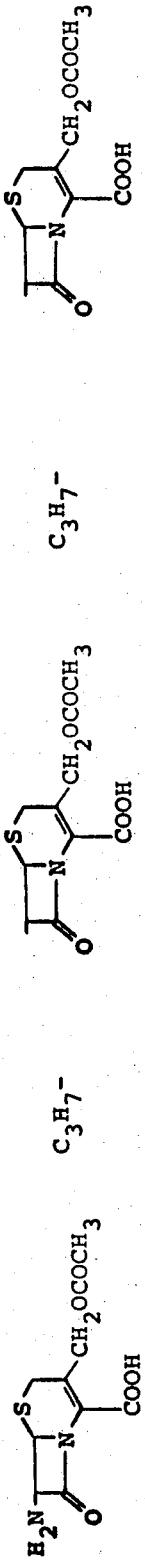 | $C_3H_7-$ | 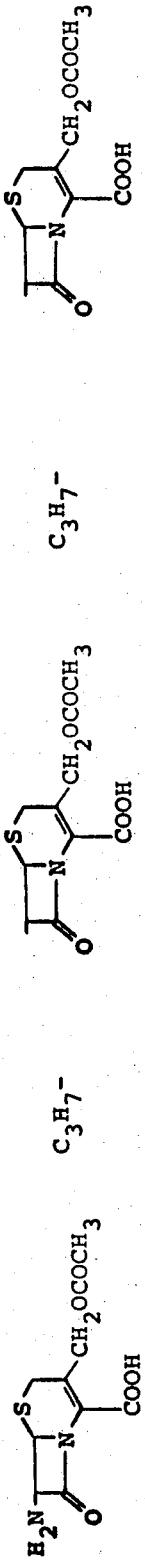 | $C_3H_7-$ | 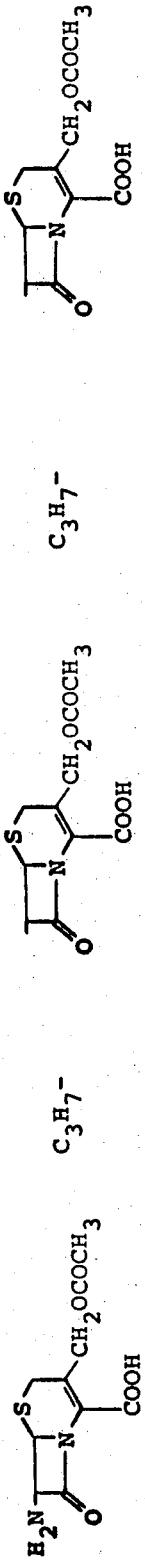 |
| 10. | $C_5H_{11}-$ | 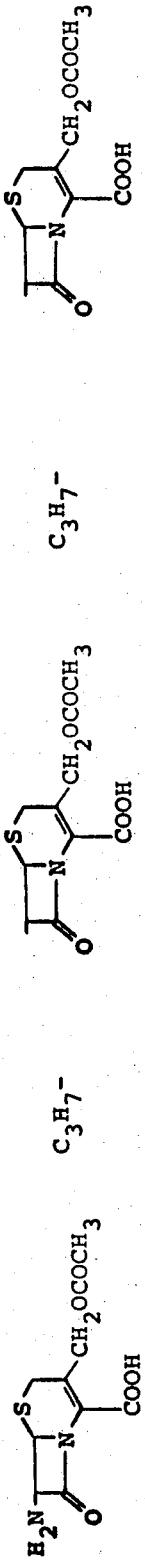 | $C_5H_{11}-$ | 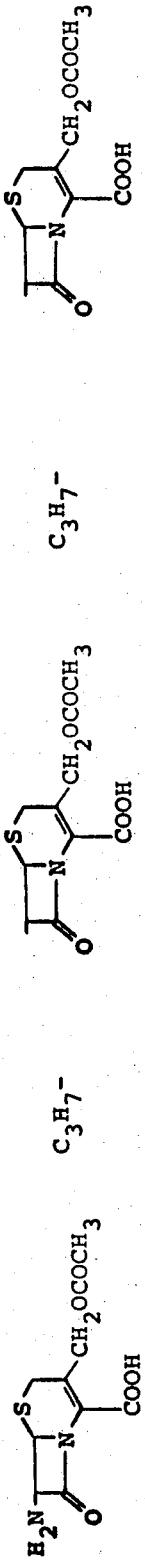 | $C_5H_{11}-$ | 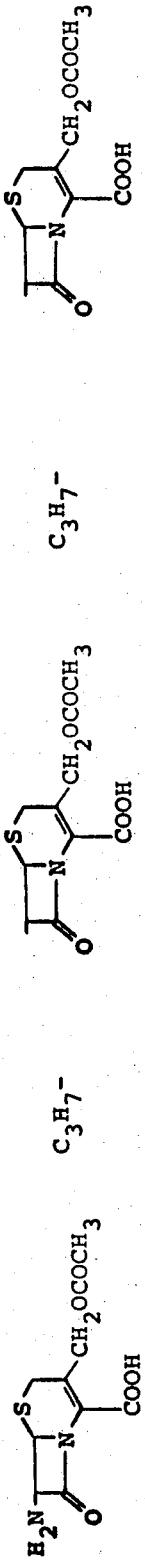 |
| 11. | 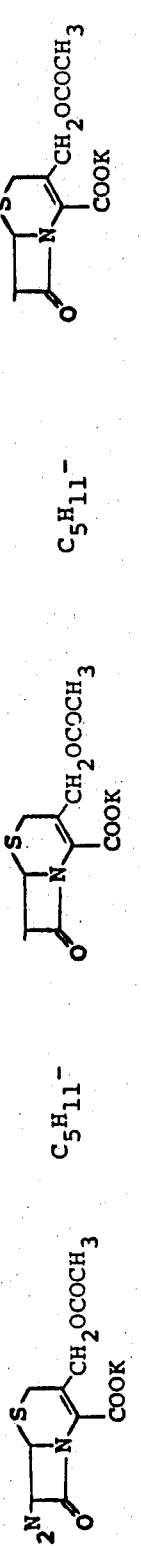 | 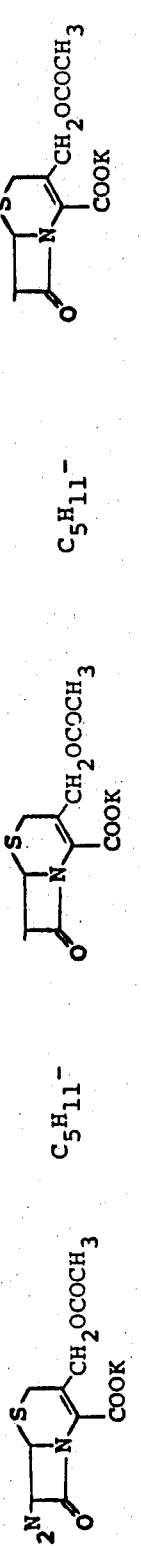 | 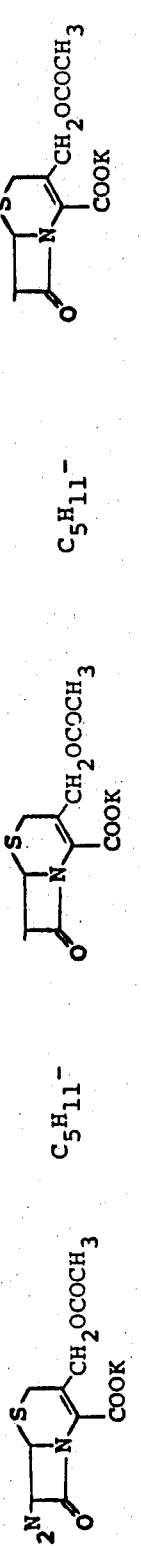 | 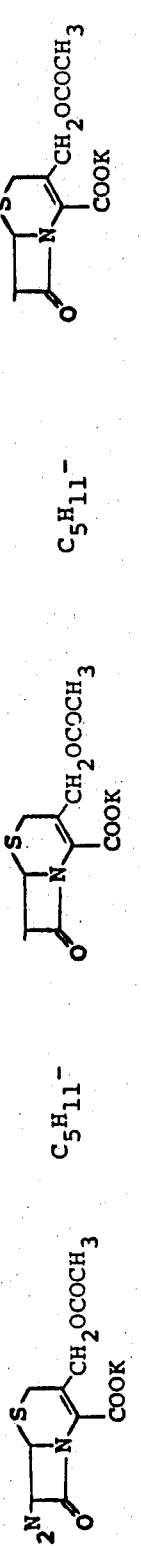 | 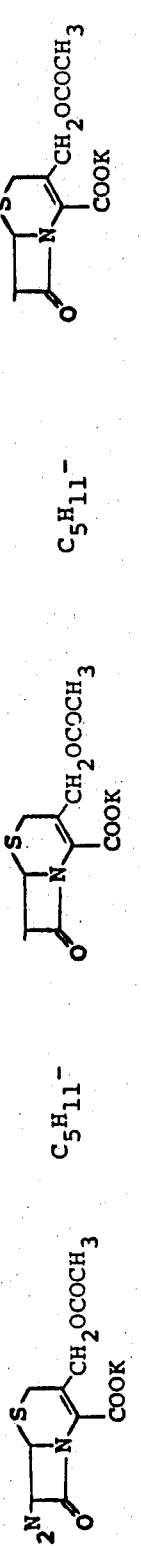 | 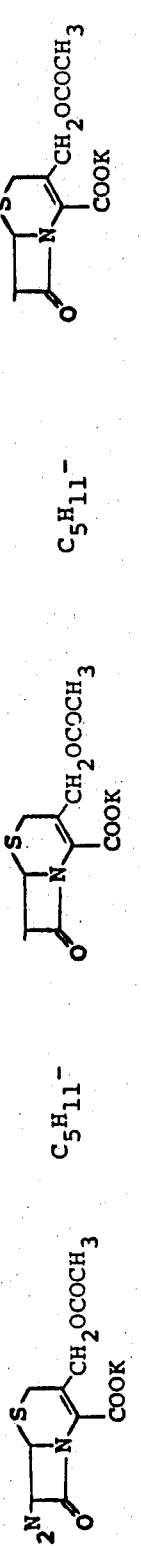 |
| 12. | 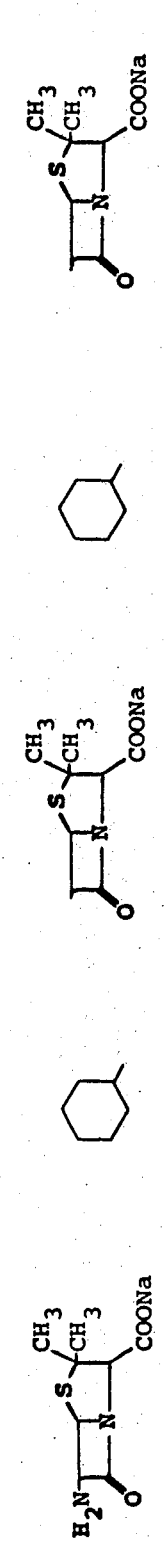 | 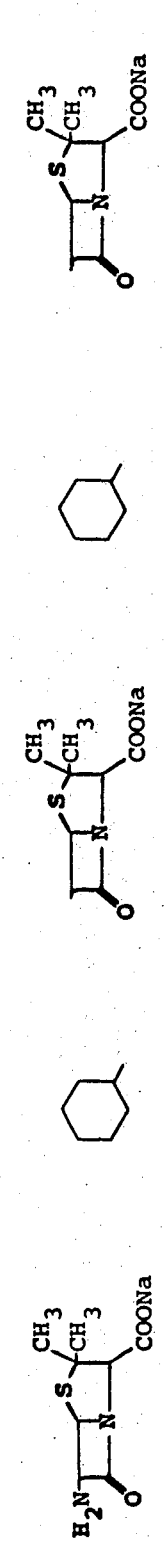 | 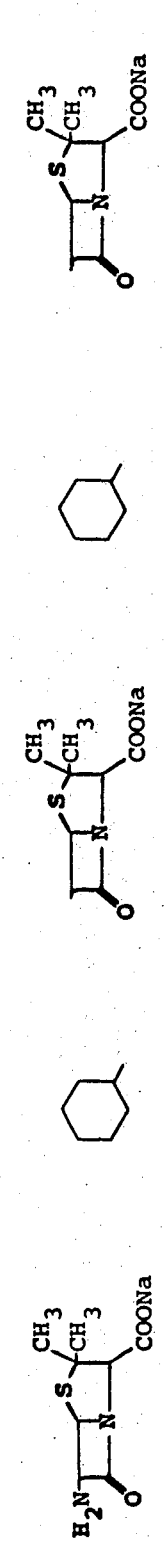 | 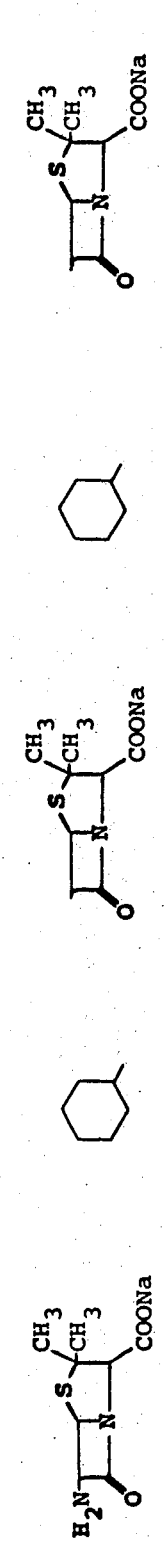 | 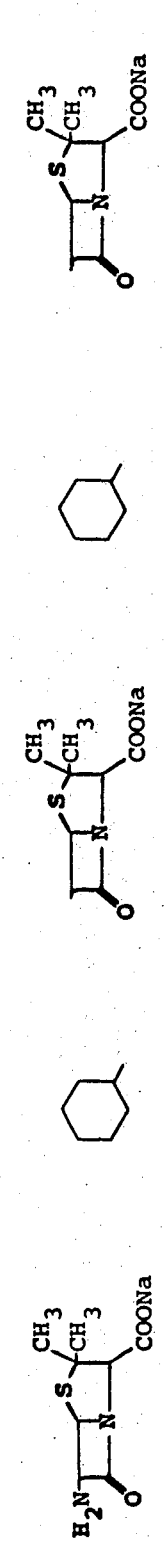 | 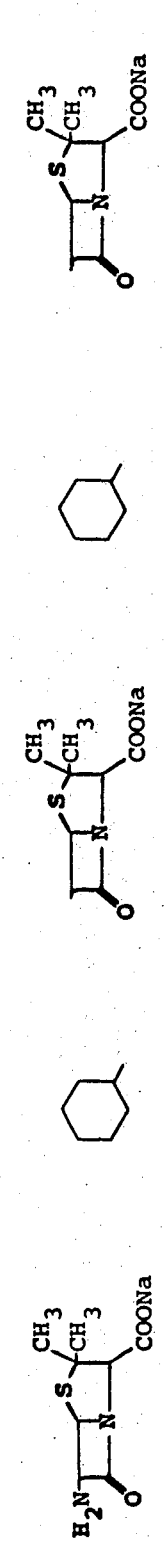 |

TABLE I—Continued

| Example No. | Column A<br>XCHO<br>X | Column B<br>H$_2$N—Y | Column C<br>XCH=NHY<br>X | Y | Column D<br>XCH$_2$NHY<br>X | Y |
|---|---|---|---|---|---|---|
| 13. | cyclohexenyl | cephalosporin (CH$_2$OCOCH$_3$, COOH) with H$_2$N— | cyclohexenyl | cephalosporin (CH$_2$OCOCH$_3$, COOH) | cyclohexenyl | cephalosporin (CH$_2$OCOCH$_3$, COOH) |
| 14. | piperazinyl (HN N—) | cephalosporin (CH$_2$OCOCH$_3$, COOH) with H$_2$N— | piperazinyl (HN N—) | cephalosporin (CH$_2$OCOCH$_3$, COOH) | piperazinyl (HN N—) | cephalosporin (CH$_2$OCOCH$_3$, COOH) |
| 15. | 4-pyridyl | penicillin (CH$_3$, CH$_3$, COONa) with H$_2$N— | 4-pyridyl | penicillin (CH$_3$, CH$_3$, COONa) | 4-pyridyl | penicillin (CH$_3$, CH$_3$, COONa) |
| 16. | pyrrolyl (NH) | penicillin (CH$_3$, CH$_3$, COONa) with H$_2$N— | pyrrolyl (NH) | penicillin (CH$_3$, CH$_3$, COONa) | pyrrolyl (NH) | penicillin (CH$_3$, CH$_3$, COONa) |

TABLE I – Continued

| Example No. | Column A<br>XCHO<br>X | Column B<br>$H_2N-Y$ | Column C<br>XCH=NHY<br>X | Y | Column D<br>$XCH_2NHY$<br>X | Y |
|---|---|---|---|---|---|---|
| 17. | thienyl | 3-methyl-cephem-COONa with H₂N | thienyl | 3-methyl-cephem-COONa | thienyl | 3-methyl-cephem-COONa |
| 18. | furyl | 3-methyl-cephem-COONa with H₂N | furyl | 3-methyl-cephem-COONa | furyl | 3-methyl-cephem-COONa |
| 19. | $CN-CH_2-$ | penam-COONa with H₂N | $CN-CH_2-$ | penam-COONa | $CN-CH_2-$ | penam-COONa |
| 20. | phenyl-oxadiazole | penam-COONa with H₂N | phenyl-oxadiazole | penam-COONa | phenyl-oxadiazole | penam-COONa |

What is claimed is:
1. A compound of the formula

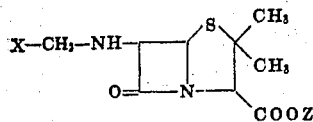

wherein X is phenyl, naphthyl, or phenyl or naphthyl substituted at the ortho-position with halogen, hydroxy, lower alkyl, lower alkoxy or amido and wherein Z is selected from the group consisting of hydrogen, lower alkyl, an alkali metal, and an alkaline earth metal. [a salt forming ion].

2. A compound in accordance with claim 1 of the formula

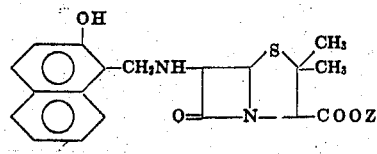

3. A compound in accordance with claim 2 wherein Z is H or Na.

* * * * *

UNITED STATES PATENT OFFICE
CERTIFICATE OF CORRECTION

Patent No. 3,821,198         Dated June 28, 1974

Inventor(s) Bong Kuk Lee, Dewey D.Y. Ryu, & Felix Edward Pansy

It is certified that error appears in the above-identified patent and that said Letters Patent are hereby corrected as shown below:

Column 2 of the Abstract of the Disclosure, first line following structures, delete the word "on" and insert in its place the word -- or --.

Claim 1, after the period on the second to the last line, delete the phrase: "[a salt forming ion].".

Signed and sealed this 29th day of October 1974.

(SEAL)
Attest:

McCOY M. GIBSON JR.
Attesting Officer

C. MARSHALL DANN
Commissioner of Patents